United States Patent [19]

Rubin

[11] Patent Number: 5,063,037

[45] Date of Patent: Nov. 5, 1991

[54] CRYSTALLINE BOROSILICATE

[75] Inventor: Mae K. Rubin, Bala Cynwyd, Pa.

[73] Assignee: Mobil Oil Corp., Fairfax, Va.

[21] Appl. No.: 913,541

[22] Filed: Sep. 24, 1986

Related U.S. Application Data

[63] Continuation of Ser. No. 647,506, Sep. 5, 1987, abandoned.

[51] Int. Cl.$^5$ .................. C01B 33/34; C01B 35/12
[52] U.S. Cl. .................................. 423/277; 502/77; 502/202
[58] Field of Search ............ 423/277; 502/202, 77, 502/6; 252/83.31

[56] References Cited

U.S. PATENT DOCUMENTS

| | | | |
|---|---|---|---|
| 4,086,186 | 4/1978 | Rubin et al. | 423/328 |
| 4,209,499 | 6/1980 | Rubin et al. | 423/329 |
| 4,269,813 | 5/1981 | Klotz | 423/277 |
| 4,275,047 | 6/1981 | Whittam | 423/329 |
| 4,376,757 | 3/1983 | Hinnenkamp et al. | 423/326 |
| 4,410,501 | 10/1983 | Taromasso et al. | 423/326 |
| 4,420,467 | 12/1983 | Whittam | 423/329 |
| 4,495,303 | 1/1985 | Kuehl | 423/329 |
| 4,523,047 | 6/1985 | Chester et al. | 585/469 |
| 4,556,549 | 11/1985 | Valyocsik | 502/70 |

FOREIGN PATENT DOCUMENTS

| | | | |
|---|---|---|---|
| 0065400 | 11/1982 | European Pat. Off. | 423/328 |
| 2024790 | 1/1980 | United Kingdom | 423/328 |
| 2079735 | 1/1982 | United Kingdom | 423/328 |

*Primary Examiner*—R. Bruce Breneman
*Attorney, Agent, or Firm*—Alexander J. McKillop; Charles J. Speciale; Laurence P. Hobbes

[57] ABSTRACT

There is provided a boron-containing aluminosilicate zeolite corresponding to the substantially aluminum and boron free silicate zeolite described in the Hinnenkamp et al. U.S. Pat. No. 4,376,757. Also provided are methods for making this borosilicate zeolite and methods for the catalytic conversion of organic charges to desired products with this borosilicate zeolite.

6 Claims, No Drawings

CRYSTALLINE BOROSILICATE

This is a continuation of copending application Ser. No. 647,506, filed on Sept. 5, 1984 now abandoned.

BACKGROUND

This invention relates to new crystalline borosilicates, to the synthesis thereof and to the use thereof in organic conversion reactions. These new crystalline borosilicates of the present invention would appear to be the boron-containing counterparts of the substantially aluminum and boron free zeolites described in the Hinnenkamp et al U.S. Pat. No. 4,376,757, the entire disclosure of which is expressly incorporated herein by reference.

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example an alkali metal or an alkaline earth metal cation. This can be expressed wherein the ratio of aluminum to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic zeolites. The zeolites have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), ZSM-35 (U.S. Pat. No. 4,016,245), ZSM-38 (U.S. Pat. No. 4,046,859), and zeolite ZSM-23 (U.S. Pat. No. 4,076,842), merely to name a few.

The $SiO_2/Al_2O_3$ mole ratio of a given aluminosilicate zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to infinity. U.S. Pat. No. 3,941,871 (Re. 29,948) discloses a porous crystalline silicate made from a reaction mixture containing no deliberately added alumina in the recipe and exhibiting the X-ray diffraction pattern characteristic of ZSM-5 type zeolites. U.S. Pat. Nos. 4,061,724, 4,073,865 and 4,104,294 describe crystalline silicates or organosilicates of varying alumina and metal content.

A number of synthetic zeolites have been prepared which may be said to be isostructural with naturally occurring zeolites. Zeolites ZSM-35 and ZSM-38 are, for instance, ferrierite-type zeolites. Zeolite ZK-20 (U.S. Pat. No. 3,459,676) is described as being isostructural with the naturally occurring zeolite levynite.

Although the term "zeolites" has sometimes been used to refer to materials containing silica and alumina, it is recognized that the silica and alumina portions may be replaced in whole or in part with other oxides. More particularly, $GeO_2$ is an art recognized substitute for $SiO_2$ and $B_2O_3$, $Cr_2O_3$, $Fe_2O_3$, and $Ga_2O_3$ are art recognized replacements for $Al_2O_3$. Accordingly, the term, zeolite, as used herein shall connote not only materials containing silicon and, optionally, aluminum atoms in the crystalline lattice structure thereof, but also materials which contain suitable replacement atoms for such silicon and/or aluminum. On the other hand, the term, aluminosilicate zeolite, as used herein shall define zeolite materials consisting essentially of silicon and, optionally, aluminum atoms in the crystalline lattice structure thereof, as opposed to materials which contain substantial amounts of suitable replacement atoms for such silicon and/or aluminum. Similarly, the term, borosilicate, as used herein shall define zeolite materials consisting essentially of silicon and, optionally, boron atoms in the crystalline lattice structure thereof.

The entire disclosures of the above-mentioned U.S. patents are expressly incorporated herein by reference.

SUMMARY

According to one aspect of the invention, there is provided a synthetic porous crystalline borosilicate zeolite having a silica to $B_2O_3$ molar ratio of from about 5 to about 500, said porous crystalline material in the uncalcined state being characterized by an x-ray diffraction pattern having values substantially as set forth in Table 1 of the specification.

According to another aspect of the invention, there is provided a method for preparing the above-mentioned synthetic porous crystalline borosilicate zeolite which comprises preparing a mixture capable of forming this synthetic porous crystalline material, said mixture containing sufficient sources of alkali metal ions, an oxide of boron, an oxide of silicon, a 2-(hydroxyalkyl)trialkylammonium cation and water, and maintaining said reaction mixture under sufficient conditions until said crystalline material is formed.

According to another aspect of the invention, there is provided a process for effecting catalytic conversion of an organic charge which comprises contacting said charge under catalytic conversion conditions with a catalyst comprising a synthetic porous crystalline borosilicate zeolite material of the present invention.

EMBODIMENTS

The as synthesized form of the borosilicate zeolite of the present invention may have at least 0.5, more preferably, at least 0.8 moles of 2-(hydroxyalkyl) trialkylammonium per mole of boron.

The term directing agent, as used herein, shall connote organic or organometallic compounds which are added to the crystallization mixture used to form a zeolite in order to influence the morphology of the ultimately formed crystal lattice. At least a portion of the cations corresponding to the directing agent are bound to anionic sites of the crystal lattice in the as synthesized form of the zeolite. A directing agent which has been verified as capable of influencing the formation of the borosilicate zeolites of the present invention, provided that other sufficient formation conditions are met, is 2-(hydroxyalkyl)trialkylammonium chloride.

The original alkali metal cations of the as synthesized borosilicate zeolite can be replaced in accordance with techniques well known in the art, at least in part, by ion exchange with other cations. Preferred replacing cations include metal ions, hydrogen ions, hydrogen precursor, e.g. ammonium, ions and mixtures thereof. Particularly preferred cations are those which render the borosilicate zeolite catalytically active, especially for hydrocarbon conversion. Replacing cations include hydrogen, rare earth metals and metals of Groups IA, IIA, IIIA, IVA, IB, IIB, IIIB, IVB and VIII of the Periodic Table of the Elements. A typical ion exchange technique would be to contact the synthetic borosilicate zeolite with a salt of the desired replacing cation or cations. Examples of such salts include the halides, e.g. chlorides, nitrates and sulfates.

Catalytically active borosilicate zeolite described and claimed herein prior to calcination, has an x-ray diffraction pattern which essentially corresponds to Table I as set forth in the Hinnenkamp et al U.S. Pat. No. 4,376,757. This Table I sets forth the following observable major peaks:

TABLE 1

| Interplanar Spacing d(A) Observed | Relative Intensity |
|---|---|
| 10.90 | VS |
| 7.02 | W |
| 5.09 | W |
| 4.32 | MS |
| 4.17 | W |
| 3.97 | M |
| 3.66 | M |
| 3.53 | VS |
| 3.35 | MS |
| 3.32 | MS |
| 3.23 | M |
| 2.88 | W |
| 2.78 | VW |
| 2.62 | W |
| 1.97 | W |
| 1.88 | W |
| 1.85 | W |

These values were determined by standard X-ray diffraction powder techniques. The radiation was the K-alpha doublet of copper, and a scintillation counter spectrometer with a strip chart pen recorder was used. The peak heights, I, and the positions as a function of $2\theta$, where $\theta$ is the Bragg angle, were read from the spectrometer chart. From these, the relative intensities 100 I/I, where $I_o$ is the intensity of the strongest line or peak, and d(obs.), the interplanar spacing in A corresponding to the recorded lines, were calculated. In Table I the relative intensities are given in terms of the symbols as follows: VW=very weak (less than 10), W=weak (10-19), M=medium (20-39), MS=medium strong (40-70) and VS=very strong (greater than 70). Ion exchange of the original cations with other cations reveals substantially the same pattern with some minor shifts in interplanar spacing and variation in relative intensity. Other minor variations can occur depending on the metal to silicon ratio of the particular sample and on whether it had been subjected to thermal treatment.

A major change in the x-ray diffraction pattern has been observed when the as synthesized form of the borosilicate zeolite was calcined to remove the organic directing agent. Such calcination may involve heating at temperatures of about 1000° F. for about 16 hours. More particularly, for example, Table II shows x-ray diffraction data for an as synthesized form of a borosilicate zeolite in accordance with the present invention.

TABLE II

| LINE NUMBER | 2THETA | D(A) | I/IMAX |
|---|---|---|---|
| 1 | 8.16 | 10.84 | 100 |
| 2 | 12.64 | 7.00 | 14 |
| 3 | 13.42 | 6.60 | 5 |
| 4 | 13.60 | 6.51 | 6 |
| 5 | 13.90 | 6.37 | 4 |
| 6 | 14.19 | 6.24 | 4 |
| 7 | 14.38 | 6.16 | 3 |
| 8 | 17.58 | 5.05 | 15 |
| 9 | 18.44 | 4.81 | 2 |
| 10 | 20.75 | 4.28 | 45 |
| 11 | 22.57 | 3.94 | 14 |
| 12 | 22.83 | 3.90 | 7 |
| 13 | 24.37 | 3.65 | 22 |
| 14 | 24.68 | 3.61 | 9 |
| 15 | 25.22 | 3.53 | 51 |
| 16 | 25.45 | 3.50 | 54 |
| 17 | 26.82 | 3.32 | 20 |
| 18 | 27.05 | 3.30 | 33 |
| 19 | 27.81 | 3.21 | 21 |
| 20 | 28.88 | 3.09 | 1 |
| 21 | 30.44 | 2.937 | 1 |
| 22 | 31.11 | 2.875 | 4 |
| 23 | 32.41 | 2.762 | 2 |
| 24 | 34.33 | 2.612 | 4 |
| 25 | 35.55 | 2.525 | 1 |
| 26 | 36.13 | 2.486 | 2 |
| 27 | 37.50 | 2.398 | 1 |
| 28 | 38.47 | 2.340 | 1 |
| 29 | 40.60 | 2.222 | 1 |
| 30 | 42.21 | 2.141 | 3 |
| 31 | 45.00 | 2.015 | 1 |
| 32 | 46.24 | 1.963 | 6 |
| 33 | 46.75 | 1.943 | 1 |
| 34 | 47.19 | 1.926 | 2 |
| 35 | 48.56 | 1.875 | 4 |
| 36 | 49.19 | 1.852 | 4 |
| 37 | 49.96 | 1.825 | 1 |
| 38 | 52.27 | 1.750 | 1 |
| 39 | 56.12 | 1.639 | 1 |
| 40 | 56.60 | 1.626 | 1 |

However, after calcination of this material for 16 hours at 1000° F., this borosilicate zeolite showed the x-ray diffraction data as set forth in Table III.

TABLE III

| LINE NUMBER | 2THETA | D(A) | I/IMAX |
|---|---|---|---|
| 1 | 9.73 | 9.09 | 100 |
| 2 | 12.86 | 6.88 | 74 |
| 3 | 14.38 | 6.16 | 9 |
| 4 | 16.10 | 5.51 | 7 |
| 5 | 18.25 | 4.86 | 3 |
| 6 | 19.20 | 4.62 | 5 |
| 7 | 19.97 | 4.45 | 12 |
| 8 | 20.54 | 4.32 | 4 |
| 9 | 21.62 | 4.11 | 13 |
| 10 | 22.91 | 3.88 | 16 |
| 11 | 23.23 | 3.83 | 16 |

TABLE III-continued

| LINE NUMBER | 2THETA | D(A) | I/IMAX |
|---|---|---|---|
| 12 | 24.10 | 3.69 | 10 |
| 13 | 25.88 | 3.44 | 42 |
| 14 | 26.85 | 3.32 | 16 |
| 15 | 27.54 | 3.24 | 11 |
| 16 | 28.89 | 3.09 | 1 |
| 17 | 36.90 | 2.436 | 1 |
| 18 | 44.30 | 2.045 | 1 |
| 19 | 46.50 | 1.953 | 1 |
| 20 | 49.38 | 1.846 | 2 |
| 21 | 50.42 | 1.810 | 1 |

The borosilicate zeolites of the present invention may be considered to be boron-containing counterparts of the substantially aluminum and boron free zeolites described in this Hinnenkamp et al U.S. Pat. No. 4,376,757.

The borosilicate zeolite of the present invention can be used either in the alkali metal form, e.g., the sodium or potassium form; the ammonium form; the hydrogen form or another univalent or multivalent cationic form. When used as a catalyst the zeolite may be subjected to thermal treatment to remove part or all of the organic constituent.

The borosilicate zeolite can also be used as a catalyst in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be exchanged into the composition to the extent atom, boron, is in the structure, impregnated therein or intimately physically admixed therewith. Such component can be impregnated in or on to it such as for example, by, in the case of platinum, treating the zeolite with a solution containing a platinum metal-containing ion. Thus, suitable platinum compounds include chloroplatinic acid, platinous chloride and various compounds containing the platinum amine complex.

The borosilicate zeolite, especially in its metal, hydrogen and ammonium forms can be beneficially converted to another form by thermal treatment. This thermal treatment is generally performed by heating one of these forms at a temperature of at least 370° C. for at least 1 minute and generally not longer than 20 hours. While subatmospheric pressure can be employed for the thermal treatment, atmospheric pressure is desired for reasons of convenience. The thermal treatment can be performed at a temperature up to about 925° C.

The new borosilicate zeolite, when employed either as an adsorbent or as a catalyst in an organic compound conversion process should be dehydrated, at least partially. This can be done by heating to a temperature in the range of 200° C. to 595° C. in an inert atmosphere, such as air, nitrogen, etc. and at atmospheric, subatmospheric or superatmospheric pressures for between 30 minutes and 48 hours. Dehydration can also be performed at room temperature merely by placing the borosilicate zeolite in a vacuum, but a longer time is required to obtain a sufficient amount of dehydration.

The new zeolite can be prepared from a reaction mixture containing sufficient sources of alkali metal ions (Z), an oxide of boron, an oxide of silica, an organic or organometallic cation (R), and water, wherein R is a 2-(hydroxyalkyl)trialkylammonium cation, wherein alkyl is composed of of one or two carbon atoms. The boron source useful in making the borosilicate zeolites of the present invention may be boric acid (i.e., $H_3BO_3$) which may be considered to be a hydrated form of $B_2O_3$ particularly in view of the following equation:

$$B_2O_3 + 3H_2O \rightarrow 2H_3BO_3$$

Crystallization of the new borosilicate zeolite can be carried out at either static or stirred conditions in a suitable reactor vessel, such as for example, polypropylene jars or teflon lined or stainless steel autoclaves. A useful range of temperatures for crystallization is from about 60° C. to about 350° C. for a time of about 12 hours to about 200 days. The pH may be from about 7 to about 14.0. Thereafter, the crystals are separated from the liquid and recovered. The composition can be prepared utilizing materials which supply the appropriate oxides. Such compositions may include sodium silicate, silica hydrosol, silica gel, silicic acid, sodium hydroxide, a source of boron, and an appropriate organic compound. It should be realized that the reaction mixture component oxides can be supplied from more than one source. The reaction mixture can be prepared either batchwise or continuously. Crystal size and crystallization time of the new crystalline borosilicate zeolite will vary with the nature of the reaction mixture employed and the crystallization conditions.

In all cases, synthesis of the borosilicate crystals is facilitated by the presence of at least 0.01 percent, preferably 0.10 percent and still more preferably 1 percent, seed crystals (based on total weight) of crystalline product.

It will be readily understood by those of ordinary skill in the art that the above recitation of useful and preferred reactants does not constitute a warranty that all possible combinations of such reactants will automatically lead to the production of the borosilicates of the present invention. Accordingly, one must select reactants and crystallization conditions in a manner sufficient to lead to the formation of this borosilicate zeolite. This selection will be readily enabled by the guidance provided herein, especially with regard to the Examples recited hereinafter. In this regard, unsuccessful first attempts in the course of routine experimentation, which depart from the express reactant selections and conditions of the Examples recited hereinafter, could be followed by second attempts more closely corresponding with the express reactant selections and conditions of the Examples recited hereinafter.

When a 2-(hydroxyalkyl)trialkylammonium directing agent is used, the 2-(hydroxyalkyl)trialkylammonium compound may be the hydroxide or halide, e.g. chloride, iodide or bromide When the compound is 2-(hydroxyethyl)trimethylammonium chloride, it is called choline chloride, a preferred source of organic cations (R) in the synthesis of the borosilicate zeolite of the present invention.

The crystals prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

In the case of many catalysts, it is desired to incorporate the new borosilicate zeolite with another material resistant to the temperatures and other conditions employed in organic conversion processes. Such materials include active and inactive material and synthetic or naturally occurring zeolites as well as inorganic materials such as clays, silica and/or metal oxides, e.g. alumina. The latter may be either naturally occurring or in the form of gelatinous precipitates or gels including mixtures of silica and metal oxides. Use of a material in conjunction with the new borosilicate zeolite crystal, i.e. combined therewith, which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g. bentonite and kaolin, to improve the crush strength of the catalyst under commercial operating conditions. Said materials, i.e. clays, oxides, etc., function as binders for the catalyst. It is desirable to provide a catalyst having good crush strength because in commercial use it is desirable to prevent the catalyst from breaking down into powder-like materials. These clay binders have been employed normally only for the purpose of improving the crush strength of the catalyst.

Naturally occurring clays which can be composited with the new crystal include the montmorillonite and kaolin families which include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the present crystal also include inorganic oxides, notably alumina.

In addition to the foregoing materials, the borosilicate zeolite can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The relative proportions of finely divided crystalline material and inorganic oxide gel matrix vary widely, with the zeolite content ranging from about 1 to about 90 percent by weight and more usually, particularly when the composite is prepared in the form of beads, in the range of about 2 to about 80 weight percent of the composite.

The borosilicate zeolite of the present invention is useful as catalyst component for a variety of organic, e.g. hydrocarbon, compound conversion processes. Such conversion processes include, as non-limiting examples, cracking hydrocarbons with reaction conditions including a temperature of from about 300° C. to about 700° C., a pressure of from about 0.1 atmosphere (bar) to about 30 atmospheres and a weight hourly space velocity of from about 0.1 to about 20; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 20; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting olefins to aromatics, e.g. benzene, toluene and xylenes, with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting alcohols, e.g. methanol, or ethers, e.g. dimethylether, or mixtures thereof to hydrocarbons including aromatics with reaction conditions including a temperature of from about 275° C. to about 600° C., a pressure of from about 0.5 atmosphere to about 50 atmospheres and a liquid hourly space velocity of from about 0.5 to about 100; isomerizing xylene feedstock components with reaction conditions including a temperature of from about 230° C. to about 510° C., a pressure of from about 3 atmospheres to about 35 atmospheres, a weight hourly space velocity of from about 0.1 to about 200 and a hydrogen/hydrocarbon mole ratio of from about 0 to about 100; disproportionating toluene with reaction conditions including a temperature of from about 200° C. to about 760° C., a pressure of from about atmospheric to about 60 atmospheres and a weight hourly space velocity of from about 0.08 to about 20; alkylating aromatic hydrocarbons, e.g. benzene and alkylbenzenes, in the presence of an alkylating agent, e.g. olefins, formaldehyde, alkyl halides and alcohols, with reaction conditions including a temperature of from about 340° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 to about 1000 and an aromatic hydrocarbon/polyalkylaromatic hydrocarbon mole ratio of from about 1/1 to about 16/1.

EXAMPLE 1

A solution of 104.0 grams of choline chloride, 3.2 grams of $H_3BO_3$, 12.0 grams NaOH and 400 grams of water was slowly added to 160.0 grams of colloidal silica (30% $SiO_2$). The mixture was placed in a teflon jar and crystallized at 150° C. A sample removed after 9 days was subjected to x-ray analysis and was characterized as the borosilicate zeolite of the present invention. After additional crystallization of 5 days at 150° C., the material was filtered, water washed and dried at 120° C. This material had about 90 percent of the purity of the earlier analyzed 9 day sample. The dried solid had the following composition:

| | |
|---|---|
| $SiO_2$, wt % | 78.0 |
| $B_2O_3$ | 0.60 |
| $Na_2O$ | 0.20 |
| $Al_2O_3$ | 0.057 |
| N | 2.14 |
| Ash | 81.0 |
| Molar Ratios | |
| $SiO_2/B_2O_3$ | 140 |
| $SiO_2/Al_2O_3$ | 2346 |

EXAMPLES 2 AND 3

Two additional samples of the borosilicate zeolite of the present invention were prepared. Reaction conditions and results are summarized in Table IV.

TABLE IV

| Example No. | 2 | 3 |
|---|---|---|
| Reaction Mixture, g | | |
| A. Choline Chloride | 104.0 | 200.0 |
| $H_3BO_3$ | 3.2 | 6.4 |
| NaOH | 12.0 | 24.0 |
| $H_2O$ | 400.0 | 800.0 |
| B. Colloidal $SiO_2$ (30%) | 160.0 | 320.0 |
| Crystallization | Teflon jar | Stirred |
| Temp. °C. | 150 | 145 |
| Time, days | 14 | 13 |
| Composition, wt % | | |
| $SiO_2$ | 79.9 | 79.1 |
| $B_2O_3$ | 0.54 | 0.60 |
| $Na_2O$ | 0.22 | 0.32 |
| $Al_2O_3$ | 0.07 | 0.09 |
| N | 2.06 | —.— |
| Ash | 81.4 | 80.9 |
| Molar Ratios | | |
| $SiO_2/B_2O_3$ | 151 | 142 |
| $SiO_2/Al_2O_3$ | 1939 | 1494 |

What is claimed is:

1. A synthetic porous crystalline borosilicate zeolite having a silica to $B_2O_3$ molar ratio of from about 5 to about 500, said porous crystalline material in the uncalcined state being characterized by an x-ray diffraction pattern having values substantially as set forth in Table 1 of the specification.

2. The crystalline material of claim 1 in as synthesized form.

3. The crystalline material resulting from thermal treatment of the crystalline material of claim 2.

4. A porous crystalline material comprising the crystalline material of claim 1 having original cations replaced, at least in part, with a cation or a mixture of cations selected from the group consisting of hydrogen and hydrogen precursors, rare earth metals, and metals of Groups IA, IIA, IIIA, IVA, IB, IIB, IIIB, IVB, VIB and VIII of the Periodic Table of the Elements.

5. A porous crystalline material comprising the crystalline material of claim 2 having original cations replaced, at least in part, with a cation or a mixture of cations selected from the group consisting of hydrogen and hydrogen precursors, rare earth metals, and metals of Groups IA, IIA, IIIA, IVA, IB, IIB, IIIB, IVB, VIB and VIII of the Periodic Table of the Elements.

6. The crystalline material resulting from thermal treatment of the crystalline material of claim 5.

* * * * *